United States Patent [19]

Johnson et al.

[11] Patent Number: 5,108,504
[45] Date of Patent: Apr. 28, 1992

[54] HIGH CHROMA COLOR DYE-SET FOR USE IN INK-JET INKS EMPLOYING POLYSACCHARIDE-CONTAINING VEHICLES

[75] Inventors: Loren E. Johnson, San Diego, Calif.; John R. Moffatt, Corvallis, Oreg.

[73] Assignee: Hewlett-Packard Company, Palo Alto, Calif.

[21] Appl. No.: 737,941

[22] Filed: Jul. 29, 1991

[51] Int. Cl.$^5$ .............................................. C09D 11/14
[52] U.S. Cl. ........................................ 106/25; 106/22; 106/209; 106/217
[58] Field of Search ................... 106/20, 22, 25, 209, 106/217

[56] References Cited

U.S. PATENT DOCUMENTS

| | | | |
|---|---|---|---|
| 4,500,355 | 2/1985 | Shimada et al. | 106/22 |
| 4,545,818 | 10/1985 | Inoue et al. | 106/25 |
| 4,702,742 | 10/1987 | Iwata et al. | 106/22 |
| 4,818,285 | 4/1989 | Causley et al. | 106/22 |
| 5,017,227 | 5/1991 | Koike et al. | 106/20 |

Primary Examiner—William R. Dixon, Jr.
Assistant Examiner—Helene Klemanski

[57] ABSTRACT

A set of dyes is provided for use in vehicles employing high molecular weight saccharides. The dye-set comprises about 1 to 4% xanthene magenta, about 0.9 to 2% of a mixture of Acid Yellow 23 and Direct Yellow 86, and about 0.75 to 2.5 of Acid Blue 9 or a mixture of Acid Blue 9 and a copper phthalocyanine dye containing not more than about 25% copper phthalocyanine. The particular dye-set evidences the following properties: good crusting resistance, good stability, the proper viscosity, the proper surface tension, recognizable secondaries, high color saturation, little color-to-color bleed, rapid drytime, no negative reaction with the vehicle, be highly soluble in the vehicle, consumer-safe, and low strike-through.

22 Claims, 1 Drawing Sheet

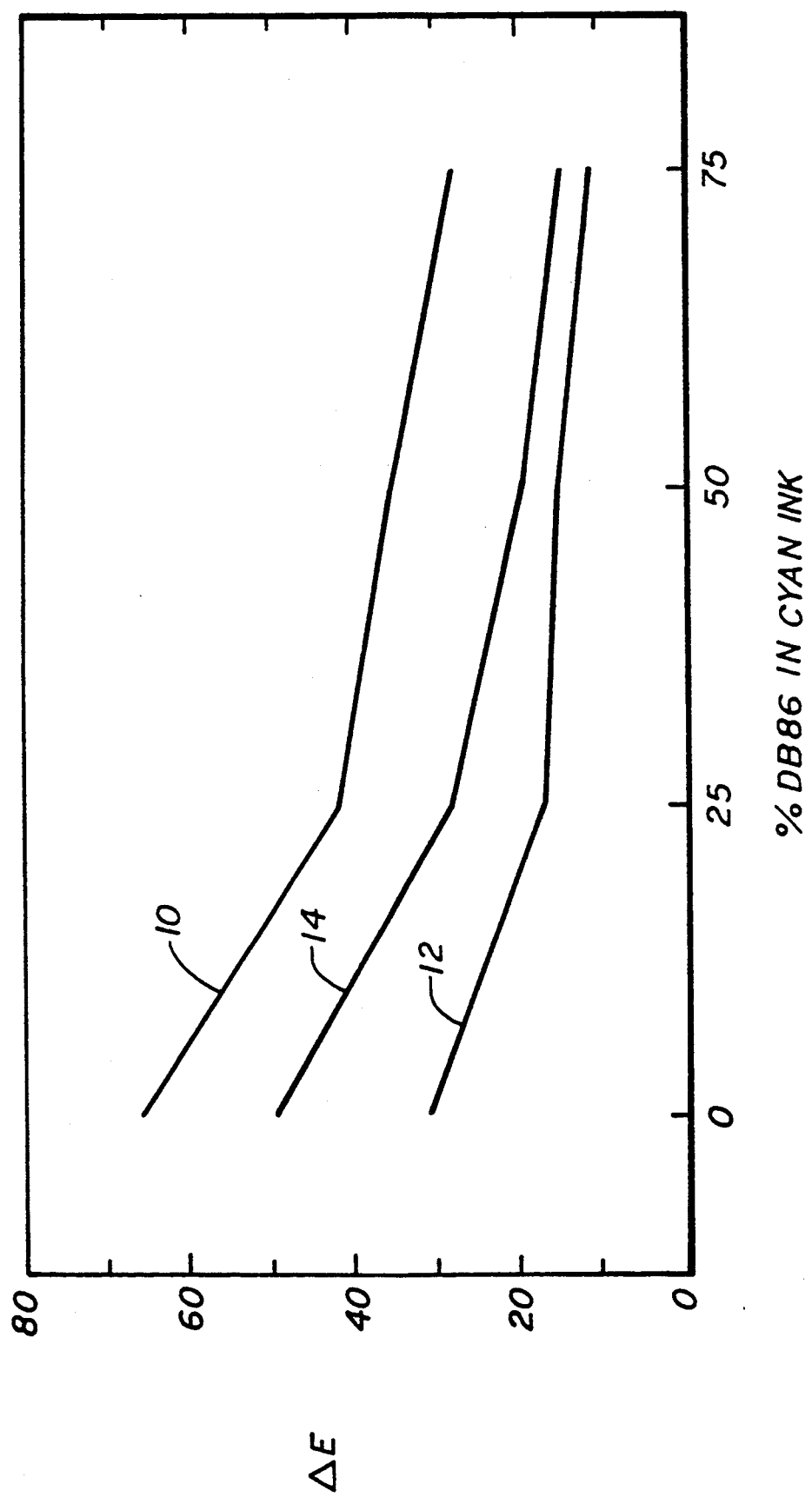

HIGH CHROMA COLOR DYE-SET FOR USE IN INK-JET INKS EMPLOYING POLYSACCHARIDE-CONTAINING VEHICLES

TECHNICAL FIELD

The present invention relates to ink-jet printing, and, in particular, to a specific dye-set suitable for use with plain and coated papers and transparencies.

BACKGROUND ART

In the field of color printing, it is desirable to achieve as large of a color gamut as possible without sacrificing necessary ink performance parameters. It is also desirable to achieve secondary colors from the primaries which the consumer readily associates with a name such as blue or red. When the color ink is used in a digital printing device, that is, one in which a dot of color is either present or absent, the ability of the primaries to give recognizable secondaries is even more important. In printing processes such as lithography, dye transfer, and some types of thermal transfer, it is possible to vary spot size so that less is demanded of the primary colored inks when producing a good secondary.

If such an ink is to be used in an ink-jet printing device, characteristics such as crusting, long term stability, and materials compatibility must also be addressed. If the ink is to be used in a thermal ink-jet printer, the further constraint of being thermally stable (kogation-resistant) is added.

In general, a successful ink-set for color ink-jet printing must have the following properties: good crusting resistance, good stability, the proper viscosity, the proper surface tension, recognizable secondaries, high color saturation, little color-to-color bleed, rapid dry-time, no negative reaction with the vehicle, be highly soluble in the vehicle, consumer-safe, and low strike-through. While formation of colors on plain papers is required, it is also necessary that the ink-set be useful on other print media as well, such as on transparency media When placed into a thermal ink-jet system, the ink-set must also be kogation-resistant.

Some of the conditions may be met by vehicle design; other conditions must be met by the proper selection and combination of the dyes.

While it is fairly simple and obvious to make one ink which will satisfy the above conditions, it becomes very difficult to produce a set of inks to be used together to give three acceptable primaries and which will satisfy these conditions.

DISCLOSURE OF INVENTION

In accordance with the invention, a set of dyes is provided that satisfies the criteria given above when used in vehicles employing high molecular weight polysaccharides in the vehicle. The dye-set comprises about 1 to 4% xanthene magenta dye, about 0.9 to 2% of a mixture of Acid Yellow 23 and Direct Yellow 86 dyes, and about 0.75 to 2.5 of Acid Blue 9 dye or a mixture of Acid Blue 9 dye and a copper phthalocyanine dye containing not more than about 25% copper phthalocyanine.

Inks made from the foregoing dyes provide a high chroma color dye-set for use with ink-jet printers on a variety of print media.

BRIEF DESCRIPTION OF THE DRAWINGS

The sole Figure, on coordinates of $\Delta E$ and dye concentration, is a plot of the effect of Direct Blue 86 dye addition to a cyan dye on $\Delta E$ due to lightfade.

BEST MODES FOR CARRYING OUT THE INVENTION

The ink-set of the invention comprises a set of dyes in a vehicle containing polysaccharides. The following dyes are employed: (1) about 1 to 4 wt. % xanthene magenta, preferably Acid Red 52 or Acid Red 289; (2) about 0.9 to 2 wt. % of a mixture of Acid Yellow 23 and Direct Yellow 86, preferably in a range from about 40:60 to 60:40 and most preferably about 50:50 at about 1 to 1.5 wt. %; and (3) about 0.75 to 2.5 wt. % Acid Blue 9 or a mixture of Acid Blue 9 and less than about 25% copper phthalocyanine dye, preferably Direct Blue 86 or Direct Blue 199.

All concentrations herein are in weight percent, unless otherwise indicated. The purity of all components is that employed in normal commercial practice for ink-jet inks.

The inks may also include one or more biocides, fungicides, and/or slimicides, as is commonly practiced in the art. Microbial reagents include, but are not limited to, NUOSEPT (Nuodex, Inc., a division of Huls Americal), UCARCIDE (Union Carbide), VANCIDE (RT Vanderbilt Co.), and PROXEL (ICI Americas).

Further, the inks may include one or more anti-kogating agents for use in thermal ink-jet printers. Anti-kogating agents are well-known and form no part of this invention.

The xanthene dyes tend to have a very high chroma on paper; they also produce brilliant blue secondaries, so they make highly desirable primaries. For example, if Direct Red 227 or Reactive Red 180 or Acid Red 27 are substituted for the Acid Red 52 in an ink-set, the hue of the blue secondary suffers markedly. Acid Red 52 and Acid Red 289 are soluble in the vehicles discussed herein and have fewer toxicological concerns than other xanthene dyes.

Acid Yellow 23 by itself is a very high chroma yellow. The parameters of an ink made with this dye are quite satisfactory. However, when Acid Yellow 23 is combined with Acid Red 52 on the paper to produce red, a chemical reaction takes place which increases the amount of photofade experienced. The fade observed is more rapid for the combination of Acid Yellow 23 and Acid Red 52 than for either dye individually. This surprising result makes the use of pure Acid Yellow 23 with pure Acid Red 52 undesirable.

On the other hand, a yellow dye such as Direct Yellow 86, which has acceptable hue, chroma, and photofade characteristics when mixed with Acid Red 52, has insufficient solubility in the vehicle to achieve good saturation; that is, it is not possible to achieve acceptable hues in the secondaries, due to low dye concentrations.

By mixing these two dyes together in the range of 40:60 to 60:40 AY23:DY86, however, an acceptably performing ink can be made. Such an ink is sufficiently soluble in the vehicle to produce good saturation and crusting performance, has high chroma, and good hue. The secondaries produced also do not show the photofade increase seen with pure Acid Yellow 23. Without subscribing to any particular theory, this result is probably due to the overall decreased concentration of Acid Yellow 23 (there is less to fade) and to the masking action of the other yellow dye (Direct Yellow 86) molecules present.

Acid Blue 9 has been found to be a good cyan dye having high chroma and good hue. Its use alone is adequate for the cyan dye in the dye-set of the invention. The blue secondaries produced when Acid Blue 9 is mixed with Acid Red 52 also experience a slightly increased rate of fade, however. This rate can be reduced by the addition of up to about 25% of a sulfonated copper phthalocyanine dye. Without subscribing to any particular theory, the increase in fade resistance seen in this mixture is probably due to the presence of copper in the ink and the masking effect of the phthalocyanine molecules. Above about 25%, considerable pen start-up problems are experienced, which limit the useful composition range.

These dyes include counter-ions for charge balance. In the as-received form, these dyes have sodium counter-ions. However, in some instances, it may be desirable to replace some or all of the counter-ions on the dye with another counter-ion, such as tetramethylammonium (as described in U.S. Pat. No. 4,761,180), lithium (as described in U.S. Pat. No. 4,994,110), or another appropriate ion.

In the case of the present invention, the sodium (Na) forms of Acid Blue 9 and Acid Red 52 may be employed. For Acid Yellow 23 and Direct Yellow 86, tetramethyl ammonium (TMA) counter-ion is preferably used, in order to reduce crusting. For the copper phthalocyanine dyes, lithium counter-ion may be employed to improve crusting performance.

In setting the concentrations of the dyes in the various inks, it is desired that the inks provide the following results:

| Dye | nm$_{max}$ | Abs ($\pm 0.005$) |
| --- | --- | --- |
| AY23-TMA | 428 | 0.026 |
| DY86-TMA | 380 | 0.025 |
| AB9-Na | 630 | 0.248 |
| AR52-Na | 566 | 0.209 |

The vehicle of the ink contains the following components:

(a) about 0.05 to 0.75 wt. % of a high molecular weight polysaccharide having a molecular weight of at least about 10,000;

(b) about 0.05 to 5 wt. % of at least one member selected from the group consisting of zwitterionic surfactants and non-ionic amphiphiles;

(c) about 0.5 to 20 wt. % of 1,5-pentanediol; and (d) the balance water.

The large polysaccharides disclosed herein for use in ink-jet printing are effective at about 0.05 to 0.75 wt. % in alleviating bleed. At levels much higher than this, the viscosity of the ink is too high to jet from a pen.

The polysaccharides used in the practice of the invention include polysaccharides derived from natural sources, such as salts of alginic acid, mannomuronic acid, carrageenan, guar and xanthan gums, dextran, chitin, and chitosan.

Alginates are naturally occurring block copolymers of the salts of L-guluronic acid and D-mannuronic acid.

Carrageenans are water-soluble, cell wall polysaccharides. Three usual forms exist: the kappa, iota, and lambda forms. All three polymers interact to form carrageenan. Typical molecular weight ranges of carrageenan are from about 300,000 to 500,000.

Guar gums isolated from several sources give highly variable structures. Estimates of average molecular weight range from about 500,000 to 2,000,000.

Xanthan gums have a structure comprising a cellulose backbone. A trisaccharide side chain on alternating sugar residues of the backbone distinguishes xanthan gums from cellulose. Several X-ray structures show that xanthan gums consist of several entwined polymer chains.

The present invention preferably uses "sodium" alginate having a molecular weight of about 12,000 to 80,000 and a typical degree of polymerization rang of about 60 to 400. This range provides the desired bleed control of the inks. Typical analysis gives 5.5% sodium, 2% calcium, and 9.5% potassium as the principal counter-ions, along with trace amounts of other mono- and di-valent cations.

The alginates most preferably employed in the practice of the invention are characterized by relatively low viscosity: a 1% solution in water yields a viscosity of 60 centipoise (cp), while a 2% solution in water yields a viscosity of 500 cp. Such material is commercially available from Aldrich Chemical Company (Milwaukee, WI).

The concentration of the polysaccharide, e.g., alginate, preferably from about 0.05 to 0.3 wt. %, and is dependent on the particular type of amphoteric or non-ionic cosurfactant(s) employed. Such dependency is easily determined by means of print quality and ink rheology.

The co-surfactant is used for bleed alleviation, as described and claimed in application Ser. No. 07/686,731, filed Apr. 17, 1991, by John R. Moffatt, entitled "Bleed Alleviation in Ink-Jet Inks", and assigned to the same assignee as the present application. Use of the polysaccharides described above in conjunction with the surfactants of that application further improves the text print quality and renders the line definition sharper between colors printing adjacent one another.

The co-surfactant (typically, one or two may be employed) is a zwitterionic surfactant or a non-ionic amphiphile, such as an amine oxide. An example of bleed alleviating surfactant amphoteric molecules is an amine oxide, such as N,N-dimethyl-N-dodecyl amine oxide (NDAO):

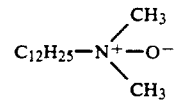

Also, in place of the $C_{12}H_{25}$—moiety, any R moiety may be used. The following moieties, their name and abbreviation are useful in the practice of the invention:

N,N-dimethyl-N-tetradecyl amine oxide (NTAO);
N,N-dimethyl-N-hexadecyl amine oxide (NHAO);
N,N-dimethyl-N-octadecyl amine oxide (NOAO);
N,N-dimethyl-N-(Z-9-octadecenyl)-N-amine oxide (OOAO).

Another example is N-dodecyl-N,N-dimethyl glycinate:

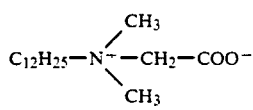

The SURFYNOLS are acetylenic polyethylene oxide surfactants, and are available from Air Products & Chemicals, Inc. They are useful in the practice of the invention and are represented as

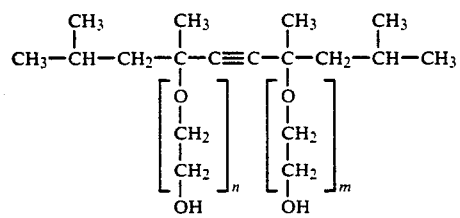

where $n+m=0$ to 50.

Preferably, the vehicle of the invention consists essentially of:
about 0.05 to 0.3% polysaccharide, such as sodium alginate,
about 0.05 to 1.1% N,N-dimethyl-N-(Z-9-octadecenyl)-N-amine oxide (OOAO),
about 0.1 to 2.35% SURFYNOL 465 (an acetylenic polyethylene oxide surfactant),
about 0.1 to 0.4% biocide, e.g., UCARCIDE 250,
about 4 to 9.4% 1,5-pentanediol, and
the balance water.

Most preferably, the vehicle of the invention consists essentially of
about 0.28% sodium alginate,
about 1.01% OOAO,
about 2.24% SURFYNOL 465,
about 0.3% biocide (UCARCIDE 250),
about 8.96% 1,5-pentanediol, and
the balance water.
This composition gives the best compromise between bleed alleviation and print quality.

INDUSTRIAL APPLICABILITY

The specific dye-set disclosed herein is expected to find commercial use in ink-jet printers.

EXAMPLES

Example 1

Inks having the following compositions were prepared, in which the vehicle comprised the following composition:
0.28% sodium alginate
1.01% OOAO
2.24% SURFYNOL 465
0.3% UCARCIDE 250
8.96% 1,5-pentanediol
balance water.

The yellow inks contained Acid Yellow 23, Direct Yellow 86, and 50% Acid Yellow 23 and 50% Direct Yellow 86 dyes. The magenta inks contained Acid Red 52 or Direct Red 227 dye. The cyan inks contained Acid Blue 9 or 75% Acid Blue 9 and 25% Direct Blue 86 Dyes.

Print samples produced using inks employing the different dyes and dye blends were measured in the $L^*a^*b^*$ colorspace from print samples. For comparative purposes, $\Delta E^*$ is obtained by taking the square root of the sum of the squares of the differences of two samples. The $L^*a^*b^*$ coordinates for the primary and secondary colors obtained using the various magentas are summarized in Table I below. The data were measured on a Minolta chromameter, D65 Illuminant, full density print samples on Gilbert bond paper. In considering hue changes, one looks primarily at the $a^*$ and $b^*$ coordinates; as a general rule, a shift of 2 units is easily visible.

TABLE I

| Dye | $L^*a^*b^*$ Coordinates. | | |
|---|---|---|---|
| | $L^*$ | $a^*$ | $b^*$ |
| A: CYAN | | | |
| AB9 | | | |
| Primary cyan | 54.78 | −12.9 | −49.8 |
| Secondary blue | 34.84 | 35.8 | −62.95 |
| (magenta + cyan: AR52 + AB9) | | | |
| AB9 + DB86 (75:25) | | | |
| Primary cyan | 53.38 | −12.7 | −48.1 |
| Secondary blue | 32.24 | 34.2 | −61.95 |
| (magenta + cyan: AR52 + AB9 + DB86) | | | |

The foregoing data show that the hue of the cyan primary and blue secondary are relatively unaffected by blending the two cyans together.

| | | | |
|---|---|---|---|
| B: YELLOW | | | |
| AY23 | 91.45 | −8.85 | 72.01 |
| Primary yellow | | | |
| DY86 | 84.84 | 1.12 | 49.02 |
| Primary yellow | | | |
| AY23 + DY86 (50:50) | 92.02 | −9.21 | 71.83 |
| Primary yellow | | | |

The foregoing data show that the hue of the yellow primary AY23 is relatively unaffected by blending the two yellows together.

| | | | |
|---|---|---|---|
| C: MAGENTA | | | |
| AR52 | | | |
| Primary magenta | 52.62 | 60.91 | −34.88 |
| Secondary red | 51.11 | 47.2 | 23.14 |
| (magenta + yellow: AR52 + AY23 + DY86) | | | |
| Secondary blue | 38.61 | 13.96 | −51.6 |
| (magenta + cyan: AR52 + AB9) | | | |

The foregoing data show that AR52 provides the best color gamut of the magenta dyes considered.

| | | | |
|---|---|---|---|
| D: MAGENTA | | | |
| DR227 | | | |
| Primary magenta | 44.35 | 48.23 | −0.1 |
| Secondary red | 40.93 | 49.14 | 24.09 |
| (magenta + yellow: DR227 + AY23) | | | |
| secondary blue | 26.99 | 6.82 | −22.40 |
| (magenta + cyan: DR227 + AB9) | | | |

The foregoing data show that the red is a bit more orange and the blue is quite a bit more purple than with AR52.

| | | | |
|---|---|---|---|
| E: MAGENTA | | | |
| AR289 | | | |
| Primary magenta | 55.43 | 69.86 | −19.12 |
| Secondary red | 60.51 | 53.52 | 17.56 |
| (magenta + yellow: AR289 + AY23) | | | |
| Secondary blue | 37.16 | 26.82 | −46.72 |
| (magenta + cyan: AR289 + AB9) | | | |

The foregoing data provide a comparison with another red xanthene dye and show that this dye is similar to AR52.

| | | | |
|---|---|---|---|
| F: MAGENTA | | | |
| RR180 | | | |
| Primary magenta | 51.58 | 56.10 | −8.96 |
| Secondary red | 50.07 | 48.51 | 28.05 |
| (magenta + yellow: RR180 + AY23) | | | |

TABLE I-continued

| Dye | L*a*b* Coordinates | | |
|---|---|---|---|
| | L* | a* | b* |
| Secondary blue (magenta + cyan: RR180 + AB9) | 32.69 | 20.76 | −35.59 |

The foregoing data show that the red is true, but that the blue is purplish.

Example 2

The purpose of this work done for this Example was to determine whether the addition of a copper phthalocyanine dye to a cyan ink containing the vehicle of Example 1 and Acid Blue 9 dye would increase the lightfastness of the primary and the secondaries. The functionality of such systems was also investigated.

Five inks were made up using the vehicle set forth in Example 1, in which approximately 0%, 25%, 50%, 75%, and 100% of the cyan dye used was Direct Blue 86 (copper phthalocyanine), the remainder being Acid Blue 9. These inks were tested for lightfade, short term crustin, and long term crusting.

The inks containing the DB86 were significantly more fade resistant in both the primaries and the secondaries than the ink which contained just AB9. Adding up to about 50% DB86 did not appreciably change the hue of the primary or secondaries. Inks with more than 25% DB86 displayed considerable start-up problems. Specifically, both the long term and short term decap times were found to decrease until at 100% DB86, the pen was unable to fire. The results are tabulated in Table II below.

TABLE II

| Crusting of DB86/AB 9 Mixtures (24° C., 45% RH). | | | |
|---|---|---|---|
| % DB86 | % AB9 | Short Term (seconds) | Long Term (spits) |
| 0 | 100 | 28 | 107 |
| 25 | 75 | 42 | 6016 |
| 50 | 50 | 15 | NR |
| 75 | 25 | 15 | NR |
| 100 | 0 | 5 | 13250 |

NR = no recovery
Spits are the number of ink drops which need to be fired in order to clear a nozzle of crusting.

The sole Figure shows the change in ΔE values versus the amount of DB9 present in the ink. The blue (AR52+cyan) and green (AY23+DY86 +cyan) secondaries (Curves 10 and 12) are shown as well as the cyan primary (Curve 14). In all cases, there is a dramatic non-linear decrease in ΔE with the addition of 25% DB86. Higher levels of DB86 only result in linear gains in lightfastness.

From these results, it may be concluded that the addition of a copper phthalocyanine dye to the ink containing AB9 is a promising solution to the cyan fade problem.

Example 3

The effect upon secondary red lightfastness by yellow was studied, using a Minolta chromameter, D65 Illuminant, full density print samples on transparency film. The results are tabulated in Table III, below.

TABLE III

| Effect upon Secondary Red Lightfastness by DY86 (Yellow). | | | |
|---|---|---|---|
| Dye | L* | a* | b* |
| AR52 + AY23 (secondary red) | | | |
| Unfaded | 69.56 | 42.94 | 0.98 |
| Faded | 71.01 | 44.16 | −20.06 |
| ΔE* = 20.24 | | | |
| AR52 + (AY23:DY86) (50:50) (secondary red) | | | |
| Unfaded | 71.34 | 41.31 | 9.44 |
| Faded | 71.34 | 42.66 | −1.79 |
| ΔE* = 11.31 | | | |

The greater the ΔE value, the greater the hue difference in the samples. Table III shows that a red produced using AR52 and a mixture of DY86 and AY23 fades about half as much as a red produced using just AY23 in combination with AR52, by comparing the respective ΔE values.

Example 4

The effect upon secondary blue lightfastness by Direct Blue 86 was studied, using a Minolta chromameter, D65 Illuminant, full density print samples on Gilbert bond. The results are tabulated in Table IV, below.

TABLE IV

| Effect upon Secondary Blue Lightfastness by DB86 (Cyan). | | | |
|---|---|---|---|
| Dye | L* | a* | b* |
| AR52 + AB9 (secondary blue) | | | |
| Unfaded | 34.83 | 35.84 | −62.9 |
| Faded | 74.81 | 15.66 | −2.106 |
| ΔE* = 75.51 | | | |
| AR52 + (AB9:DB86) (75:25) (secondary blue) | | | |
| Unfaded | 33.64 | 32.61 | −62.1 |
| Faded | 47.14 | 12.56 | −27.7 |
| ΔE* = 42.04 | | | |

Table IV shows that the addition of DB86 to AB9 reduces fade considerably (nearly 50%). This is also shown in the sole Figure, discussed above.

Finally, the preferred ink-set of the invention prints a good black color as compared to the various dye combinations that are possible from the foregoing dyes.

Thus, there has been disclosed an ink-set for use in ink-jet printers. It will be readily apparent to those skilled in this art that various changes and modifications of an obvious nature may be made without departing from the spirit of the invention, and all such changes and modifications are considered to fall within the scope of this invention, as defined by the appended claims.

What is claimed is:

1. An ink-jet ink-set comprising magenta ink, yellow ink, and cyan inks for use with ink-jet printers, each ink comprising a vehicle and at least one dye:
   (a) said vehicle containing at least one high molecular weight polysaccharide;
   (b) said magenta ink consisting essentially of about 1 to 4 wt. % xanthene magenta dye;
   (c) said yellow ink consisting essentially of about 0.9 to 2wt. % of a mixture of Acid Yellow 23 and Direct Yellow 86 dyes; and (d) said cyan ink consisting essentially of about 0.75 to 2.5wt. % of Acid Blue 9 dye or of a mixture of Acid Blue 9 dye and up to about 25wt. % of a copper phthalocyanine dye.

2. The ink-set of claim 1 wherein said xanthene magenta dye is selected from the group consisting of Acid Red 52 and Acid Red 289 dyes.

3. The ink-set of claim 1 wherein said mixture of Acid Yellow 23 and Direct Yellow 86 dyes ranges in ratio from about 40:60 to 60:40 of AY23:DY86.

4. The ink-set of claim 3 wherein said ratio is about 50:50 and is present in said ink in an amount ranging from about 1 to 1.5wt. %.

5. The ink-set of claim 1, wherein both Acid Yellow 23 and Direct Yellow 86 dyes include tetramethylammonium counter-ion.

6. The ink-set of claim 1 wherein said copper phthalocyanine dye is selected from the group consisting of Direct Blue 86 and Direct Blue 19 dyes.

7. The ink-set of claim 1, wherein said copper phthalocyanine dye includes lithium counter-ion.

8. The ink-set of claim 1 wherein said vehicle comprises:
(a) about 0.05 to 0.75 wt. % of a high molecular weight polysaccharide having a molecular weight of at least about 10,000;
(b) about 0.05 to 5 wt. % of at least one member selected from the group consisting of zwitterionic surfactants and non-ionic amphiphiles;
(c) about 0.5 to 20 wt. % of 1,5-pentanediol; and
(d) the balance water.

9. The ink-set of claim 8 wherein said high molecular weight polysaccharide is selected from the group consisting of alginic acid, mannomuronic acid, carrageenan, guar and xanthan gums, dextran, chitin, and chitosan.

10. The ink-set of claim 9 wherein said alginic acid is present as a salt thereof, having a molecular weight of about 12,000 to 80,000.

11. The ink-set of claim 9 wherein said carrageenan has a molecular weight ranging from about 300,000 to 500,000.

12. The ink-set of claim 8 wherein said amphoteric surfactants are pH-sensitive surfactants selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, N-dodecyl-N,N-dimethyl glycine, and an acetylenic polyethylene oxide surfactant.

13. The ink-set of claim 8 wherein said vehicle consists essentially of:
about 0.05 to 0.3% sodium alginate;
about 0.05 to 1.1% N,N-dimethyl-N-(Z-9-octadecenyl)-N-amine oxide;
about 0.1 to 2.35wt. % of an acetylenic polyethylene oxide surfactant;
about 0.1 to 0.4wt. % biocide;
about 4 to 9.4wt. % 1,5-pentanediol; and
the balance water.

14. The ink-set of claim 13 wherein said vehicle consists essentially of:
about 0.28wt. % sodium alginate;
about 1.01% N,N-dimethyl-N-(Z-9-octadecenyl)-N-amine oxide;
about 2.24wt. % of an acetylenic polyethylene oxide surfactant;
about 0.3wt. % biocide;
about 8.96wt. % 1,5-pentanediol; and
the balance water.

15. An improved ink-jet dye-set for ink-jet printing including (a) a mixture of Acid Yellow 23 and Direct Yellow 86 and (b) a xanthene magenta dye.

16. The dye-set of claim 15 wherein said mixture of Acid Yellow 23 and Direct Yellow 86 ranges in a ratio from about 40:60 to 60:40 of AY23:DY86.

17. The dye-set of claim 16 wherein said ratio is about 50:50.

18. The dye-set of claim 15, wherein both Acid Yellow 23 and Direct Yellow 86 dyes include tetramethylammonium counter-ion.

19. The dye-set of claim 15 wherein said xanthene magenta dye is selected from the group consisting of Acid Red 52 and Acid Red 289 dyes.

20. An improved ink-jet dye-set for ink-jet printing including a mixture of Acid Blue 9 and a copper phthalocyanine dye containing not more than about 25wt. % copper phthalocyanine.

21. The dye-set of claim 20 wherein said copper phthalocyanine dye is selected from the group consisting of Direct Blue 86 and Direct Blue 199.

22. The dye-set of claim 20, wherein said copper phthalocyanine dye includes lithium counter-ion.

* * * * *